US010556253B2

(12) United States Patent
Khan

(10) Patent No.: US 10,556,253 B2
(45) Date of Patent: Feb. 11, 2020

(54) PARCEL SORTING APPARATUS WITH ROUTING MANIFOLD AND DIVERTER SYSTEM

(71) Applicant: Amazon Technologies, Inc., Seattle, WA (US)

(72) Inventor: Bijoysri Khan, Luxembourg (LU)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/965,066

(22) Filed: Apr. 27, 2018

(65) Prior Publication Data
US 2019/0329296 A1 Oct. 31, 2019

(51) Int. Cl.
*B07C 3/06* (2006.01)
*B07C 3/00* (2006.01)
*B07C 5/36* (2006.01)
*B65G 47/64* (2006.01)
*B65G 47/68* (2006.01)

(52) U.S. Cl.
CPC ............ *B07C 3/006* (2013.01); *B07C 5/362* (2013.01); *B65G 47/64* (2013.01); *B65G 47/683* (2013.01)

(58) Field of Classification Search
CPC .......... B07C 1/10; B07C 3/003; B07C 3/006; B07C 3/008; B07C 3/02; B07C 3/06; B07C 3/065; B07C 3/08; B07C 5/361; B07C 5/362; B07C 5/38; B65G 47/64; B65G 47/644; B65G 47/646; B65G 47/647; B65G 47/683
See application file for complete search history.

(56) References Cited

U.S. PATENT DOCUMENTS

| | | | | |
|---|---|---|---|---|
| 4,004,681 A | * | 1/1977 | Clewett | B65G 47/962 198/370.03 |
| 4,804,078 A | * | 2/1989 | Scata' | B65G 47/646 198/346.2 |
| 5,538,140 A | * | 7/1996 | Guenther | B07C 3/06 209/552 |
| 5,967,290 A | * | 10/1999 | Bonnet | B65G 47/53 198/370.01 |
| 6,095,314 A | | 8/2000 | Fortenbery | |

(Continued)

OTHER PUBLICATIONS

PCT International Search Report for Application No. PCT/US2019/028224 dated Jul. 15, 2019.

*Primary Examiner* — Joseph C Rodriguez
(74) *Attorney, Agent, or Firm* — Patterson + Sheridan, LLP

(57) ABSTRACT

An apparatus for sorting parcels is described comprising a transport surface configured to convey parcels between a first end and a second end thereof. An opening defined in the transport surface is dimensioned to receive one or more of the parcels therethrough. The transport surface comprises a plurality of surface segments having a selected geometry and surface characteristics for controlling speeds of the parcels as they are conveyed. The apparatus further comprises a routing manifold having a chute having an inlet registered with the opening, a plurality of outlets coupled to the inlet, and a first diverter system comprising one or more diverters disposed in the routing manifold and operable to selectively direct the received parcels toward any outlet of the plurality of outlets. The one or more diverters may be responsive to destination information associated with the individual parcels.

20 Claims, 8 Drawing Sheets

(56) References Cited

U.S. PATENT DOCUMENTS

| | | | | |
|---|---|---|---|---|
| 6,227,377 B1* | 5/2001 | Bonnet | ............... | B65G 21/12 |
| | | | | 198/435 |
| 6,460,681 B1* | 10/2002 | Coutant | ............... | B07C 3/06 |
| | | | | 198/370.03 |
| 6,499,582 B1* | 12/2002 | Gillott | ............... | B65G 47/647 |
| | | | | 193/31 R |
| 6,688,083 B1* | 2/2004 | Fitzgibbons | ............... | B07C 3/06 |
| | | | | 271/207 |
| 6,688,459 B1* | 2/2004 | Bonham | ............... | B65G 47/44 |
| | | | | 198/370.07 |
| 6,897,395 B2* | 5/2005 | Shiibashi | ............... | B07C 3/082 |
| | | | | 209/584 |
| 7,597,185 B1* | 10/2009 | Fortenbery | ............... | B65G 11/123 |
| | | | | 193/25 A |
| 8,919,529 B1* | 12/2014 | Erceg | ............... | B65G 47/962 |
| | | | | 198/360 |
| 9,592,989 B2* | 3/2017 | Herrmann | ............... | B65H 39/115 |
| 9,795,995 B2* | 10/2017 | Zimmer | ............... | B07C 3/06 |
| 9,962,743 B2* | 5/2018 | Bombaugh | ............... | B07C 5/36 |
| 10,000,346 B2* | 6/2018 | Berdelle-Hilge | ............... | B65G 47/965 |
| 2004/0073333 A1* | 4/2004 | Brill | ............... | B07C 3/08 |
| | | | | 700/224 |
| 2018/0264521 A1* | 9/2018 | Chapelet | ............... | B07C 1/16 |

* cited by examiner

PARCEL SORTING APPARATUS WITH ROUTING MANIFOLD AND DIVERTER SYSTEM

BACKGROUND

The present disclosure relates to techniques for sorting parcels, and more specifically, to implementations of an apparatus having a routing manifold and diverter system.

The shipment of parcels typically involves the intake of parcels at a warehouse or other suitable location, moving the parcels to different locations within the warehouse during processing, and loading the parcels onto trucks or other transport vehicles for external distribution. The processing of the parcels at the warehouse may include one or more sorting operations. For example, a sortation system may sort and distribute parcels to a plurality of stations where associates manually aggregate the distributed parcels (e.g., add parcels to a pallet or container). The parcels may be sorted and/or aggregated according to one or more criteria, such as associated destination information.

Within sorting operations, there may be some time periods in which parcels are provided to the stations at a reduced rate. During these periods, the associates may be waiting or otherwise underutilized. In some cases, the sortation system may perform an accumulation or buffering function, enabling the associates to be utilized elsewhere in the warehouse until a significant number of parcels are available for aggregation. Further, the aggregation of parcels can require associates to manually transport parcels between different locations in the warehouse, which is generally a less efficient use of the associates.

BRIEF DESCRIPTION OF DRAWINGS

Various embodiments in accordance with the present disclosure will be described with reference to the drawings, where like designations denote like elements.

DETAILED DESCRIPTION

According to one or more embodiments described herein, an apparatus for sorting parcels is disclosed in which a transport surface is configured to convey parcels along a transport path defined between a first end and a second end of the transport surface. An opening is defined in the transport surface at a first elevation and is dimensioned to receive one or more of the parcels therethrough. The transport surface comprises a plurality of surface segments arranged between the first end and the second end, where each of the plurality of surface segments has a selected geometry and surface characteristics for controlling speeds of the parcels as they are conveyed along the transport path. The apparatus further comprises a routing manifold disposed at a second elevation less than the first elevation. The routing manifold comprises a chute having an inlet registered with the opening, a plurality of outlets coupled to the inlet, and a first diverter system comprising one or more diverters disposed in the routing manifold and operable to selectively direct the received parcels toward any outlet of the plurality of outlets. In some embodiments, the one or more diverters are responsive to destination information associated with the individual parcels.

Beneficially, the apparatus may be used to perform parcel sorting between multiple destinations with increased automation. The apparatus may be used to automatically sort parcels into different containers, such as bags, bins, or gaylords. The different containers may have different sizes and/or different types.

Figure 1:
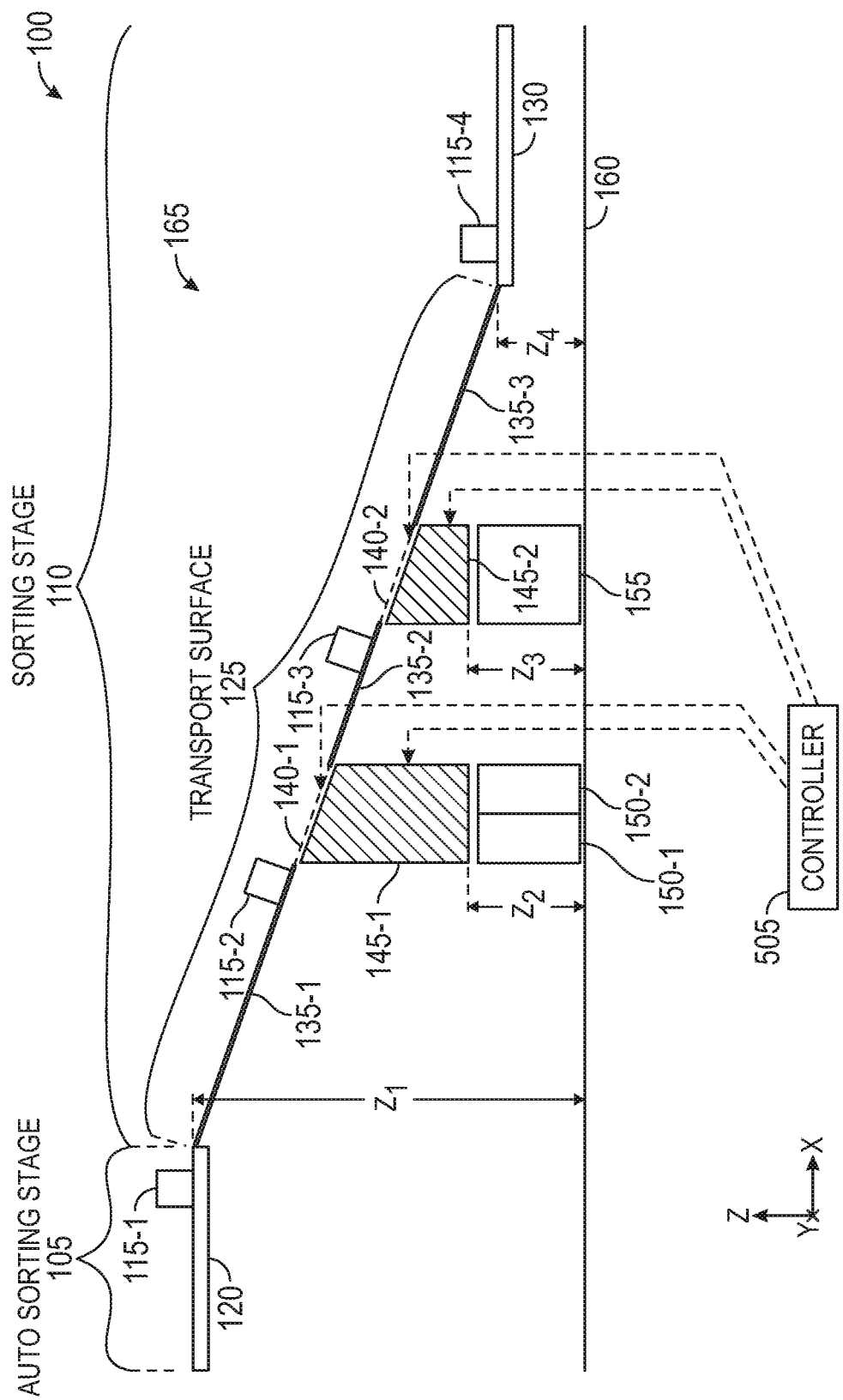
FIG. 1 is a diagram illustrating an exemplary system for sorting parcels, according to various embodiments.

FIG. 1 is a diagram illustrating an exemplary system 100 for sorting parcels, according to various embodiments. More specifically, FIG. 1 illustrates a cross-sectional view of the system 100. The system 100 may represent a portion of a warehouse or other suitable environment. Some non-limiting examples of the warehouse include an order fulfillment center and a sort center.

The system 100 comprises an autosorting stage 105 and a sorting stage 110. The autosorting stage 105 may have any suitable implementation, such as one or more robotic systems that are configured to distribute parcels between different sorting stages 110. The autosorting stage 105 may provide parcels (such as parcel 115-1) to the sorting stage 110 at a first height Z1 relative to a reference surface 160, such as a floor level of the warehouse. As shown, a surface 120 slopes down to the first height Z1.

The sorting stage 110 is configured to distribute the parcels between a plurality of containers 150-1, 150-2, 155, and a manual sorting station 130. An apparatus 165 of the sorting stage 110 comprises a transport surface 125 configured to convey the parcels between a first end (also referred to as an "upstream point") and a second end (also referred to as a "downstream point") of the transport surface 125. As shown, the transport surface 125 extends between the first elevation Z1 and a second elevation Z4. A surface of the manual sorting station 130 may be arranged at the second elevation Z4, which may be selected according to ergonomic considerations.

In one non-limiting example, which may represent a gravity-assisted implementation of the apparatus 165, the first elevation Z1 is between about 4 and about 5 meters (m), and the second elevation Z4 is about 800 millimeters (mm). Other values of the first elevation Z1 and the second elevation Z4 are also possible. In another example of a non-gravity assisted implementation of the apparatus 165, the first elevation Z1 and the second elevation Z4 may be substantially the same.

A plurality of surface segments 135-1, 135-2, 135-3 collectively defines the transport surface 125. One or more openings 140-1, 140-2 may be defined in the transport surface 125, which are dimensioned to receive one or more parcels therethrough. As shown, the opening 140-1 is arranged between the surface segments 135-1, 135-2, and the opening 140-2 is arranged between the surface segments 135-2, 135-3.

Although not explicitly shown, in some embodiments the system 100 may comprise one or more doors arranged at the openings 140-1, 140-2. Each door may be selectively positionable between at least a first position in which the door closes the corresponding opening 140-1, 140-2 and forms at least a portion of the transport surface 125, and a second position in which the door opens the corresponding opening 140-1, 140-2 to allow the one or more parcels through the corresponding opening 140-1, 140-2.

In some embodiments, one or more actuatable components are provisioned proximate to the transport surface 125 are controlled to selectively permit parcel(s) to pass through the openings 140-1, 140-2. For example, the one or more actuatable components may be disposed at or near the openings 140-1, 140-2 (e.g., actuators connected with the doors), at or near the surface segments 135-1, 135-2, 135-3 (e.g., a paddle diverter disposed above the transport surface 125), and/or integrated with the transport surface 125 (e.g., motor-driven rollers configured to direct parcel(s) toward and/or away from the openings 140-1, 140-2).

A controller 505 may acquire destination information associated with multiple parcels 115-1, 115-2, 115-3, 115-4, and may communicate control signals to operate the one or more actuatable components to sort the parcels 115-1, 115-2, 115-3, 115-4 according to the destination information. The destination information may be acquired using one or more sensors (e.g., a visual scan of labelling on the parcels 115-1, 115-2, 115-3, 115-4).

The acquired destination information may have any suitable form: a destination within the warehouse (such as a particular container 150-1, 150-2, 155, or a particular environment location), a destination external to the warehouse (such as a portion of a destination mailing address or a particular transport vehicle), and so forth. Using the acquired destination information, the controller 505 may operate the one or more actuatable components to permit the parcels to pass through the openings 140-1, 140-2 or to bypass the openings 140-1, 140-2.

Each of the plurality of surface segments 135-1, 135-2, 135-3 may have a selected geometry and surface characteristics for controlling speeds of the parcels as they are conveyed between the upstream point and the downstream point. For example, different ones of the surface segments 135-1, 135-2, 135-3 may comprise material(s) with different coefficients of friction, and/or may have different slopes relative to the reference surface 160. Beneficially, controlling speeds of the parcels may allow a more efficient sorting and/or processing of the parcels, as well as mitigating a risk of damage to the parcels during conveyance.

The surface segments 135-1, 135-2, 135-3 may include any material(s) that are suitable for supporting the parcels being conveyed on the transport surface 125. Some non-limiting examples of the material(s) include sheet metal (e.g., made of aluminum), wood, plastic, and so forth. In some cases, the surface segments 135-1, 135-2, 135-3 may include coatings and/or textures for providing desired coefficients of friction.

The plurality of surface segments 135-1, 135-2, 135-3 may include passive surface segments and/or active surface segments. Some non-limiting examples of passive surface segments include substantially planar sliding surface segments and non-driven rollers. Some non-limiting examples of active surface segments include conveyor belts, motor-driven rollers, and self-driven rollers.

In one embodiment, the apparatus 165 comprises a slide defining the transport surface 125, and the plurality of surface segments 135-1, 135-2, 135-3 comprises a substantially continuous sliding surface between the first end and the second end.

The apparatus 165 further comprises a routing manifold 145-1 disposed below the opening 140-1 (in the Z-direction), and a routing manifold 145-2 disposed below the opening 140-2. Each of the routing manifolds 145-1, 145-2 is configured to receive one or more parcels passing through the corresponding opening 140-1, 140-2, and to direct the one or more parcels to a selected outlet of a plurality of outlets. In some embodiments, movement of parcels through the routing manifolds 145-1, 145-2 may be gravity-assisted. In some embodiments, the controller 505 is further configured to communicate control signals to operate one or more actuatable components that are included in the routing manifolds 145-1, 145-2. Operation of the one or more actuatable components may direct or allow parcels to travel toward selected outlets.

In the system 100, the containers 150-1, 150-2 are arranged beneath respective outlets of the routing manifold 145-1, and the container 155 is arranged beneath an outlet of the routing manifold 145-2. The containers 150-1, 150-2, 155 may be arranged atop the reference surface 160, but other implementations may have one or more of the containers 150-1, 150-2, 155 arranged at a different elevation.

The routing manifold 145-1 extends from an elevation Z2 substantially to the opening 140-1, and the routing manifold 145-2 extends from an elevation Z3 substantially to the opening 140-2. In some embodiments, the elevations Z2, Z3 may be selected based on a height of the respective containers 150-1, 150-2, 155. In some cases, the elevations Z2, Z3 may be selected to be sufficiently close to the containers 150-1, 150-2, 155 (e.g., substantially less than a dimension of the parcels) to prevent missorted parcels (e.g., parcels directed into an incorrect container) and/or lost parcels. In some embodiments, the elevations Z2, Z3 of the routing manifolds 145-1, 145-2 may be mechanically and/or manually adjustable.

In some embodiments, the routing manifolds 145-1, 145-2 may be rigidly connected with the transport surface 125 and inlets of the routing manifolds 145-1, 145-2 may register with the corresponding openings 140-1, 140-2. In other embodiments, the routing manifolds 145-1, 145-2 and the transport surface 125 may be in an unconnected arrangement when the inlets are registered with the corresponding openings 140-1, 140-2.

In some embodiments, the routing manifolds 145-1, 145-2 may be flexibly connected with the transport surface 125, and the plurality of outlets may be movable relative to an inlet of the routing manifolds 145-1, 145-2. For example, the routing manifolds 145-1, 145-2 may include wall sections formed of flexible material(s) and/or having a geometry such as pleated sides (e.g., having an appearance like a bellows or an accordion). In some embodiments, the inlets of the routing manifolds 145-1, 145-2 may be movable relative to the openings 140-1, 140-2. For example, the system 100 may include mechanical actuators configured to reposition the routing manifolds 145-1, 145-2 (e.g., through rolling or sliding), and/or means for manually repositioning the routing manifolds 145-1, 145-2 (e.g., one or more handles operable by an associate). Thus, the routing manifolds 145-1, 145-2 may be reconfigurable to easily accommodate different types and/or arrangements of containers 150-1, 150-1, 155.

Although the transport surface 125 is shown as having substantially planar surface segments 135-1, 135-2, 135-3 that are arranged in a substantially co-planar configuration, other configurations are also possible. Stated another way, the transport surface 125 may comprise surface segments 135-1, 135-2, 135-3 that are non-planar and/or a configuration that is not co-planar. In some alternate implementations, one or more of the surface segments 135-1, 135-2, 135-3 may be curved, and/or the transport surface 125 may include portions that form sidewalls or retaining features. In some alternate implementations, the transport surface 125 may include turns, curves, or may have the surface segments 135-1, 135-2, 135-3 in a serpentine arrangement.

Figure 2:
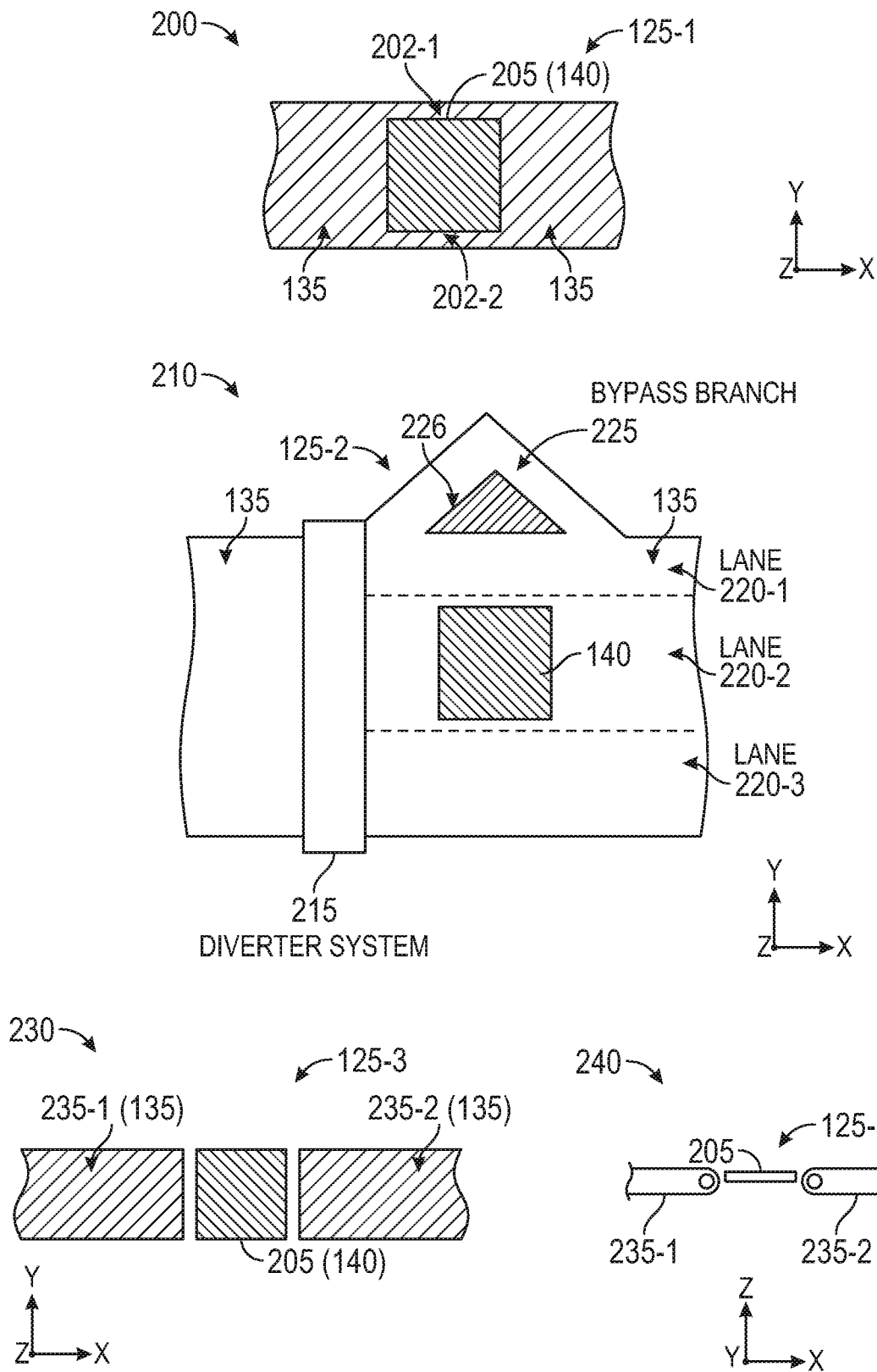
FIG. 2 is a diagram illustrating exemplary implementations of a transport surface, according to various embodiments.

FIG. 2 includes diagrams 200, 210, 230 illustrating exemplary embodiments of the transport surface 125, and more specifically, top views of the embodiments of the transport surface 125. The features discussed herein may be used in conjunction with other embodiments, such as the apparatus 165 of FIG. 1.

In the diagram 200, a first transport surface 125-1 includes two surface segments 135 that are substantially spaced apart. As shown, the two surface segments 135 are connected by two regions 202-1, 202-2 that are relatively narrow (as shown, in the Y-direction) compared with the opening 140. Alternate implementations may include a different number of regions, and/or may have surface segments 135 that are entirely detached from each other in the plane of the two surface segments 135.

In the diagram 200, an opening 140 is formed in the transport surface 125-1, and a door 205 in arranged at the opening 140. The door 205 is shown as being in a closed position, such that the door 205 forms a portion of the transport surface 125-1. For example, a surface of the door 205 may be coplanar with the two surface segments 135. When the door 205 is positioned in an open position, parcels conveyed along the transport surface 125-1 (e.g., in a left-to-right direction as shown) may be allowed through the opening 140 and into a corresponding routing manifold.

In the diagram 210, a second transport surface 125-2 includes two surface segments 135 that are substantially spaced apart. A diverter system 215 is arranged between the two surface segments 135, and is configured to divert or otherwise position parcels to be conveyed toward and/or away from the openings. The diverter system 215 may include one or more actuatable diverters of any suitable types, such as one or more paddle diverters.

In some embodiments, the diverter system 215 is configured to divert parcels onto a selected one of a plurality of lanes 220-1, 220-2, 220-3. In some embodiments, the operation of the diverter system 215 may be controlled based on destination information associated with the parcels. As shown, the lanes 220-1, 220-2, 220-3 are arranged substantially in parallel, although other arrangements are also possible. In some cases, the lanes 220-1, 220-2, 220-3 may include independent surface segments, which may be delineated with walls or other suitable features. As shown, the lane 220-2 includes the opening 140, and the lanes 220-1, 220-3 do not include corresponding openings.

In some embodiments, the diverter system 215 is configured to divert parcels onto a bypass branch 225 that extends away from the surface segments 135 to prevent the parcels from being directed toward the opening 140. The bypass branch 225 may have any suitable passive and/or active implementation, such as a sliding surface, non-powered or powered rollers, conveyor belts, and so forth. Further, although the bypass branch 225 is shown as extending away from the surface segments 135 so as to form an opening 226, alternate implementations of the bypass branch 225 may form a substantially continuous interface with the surface segments 135.

In the diagram 230, a third transport surface 125-3 comprises two conveyor belts 235-1, 235-2 that are spaced apart from each other by the opening 140. The conveyor belts 235-1, 235-2 may represent examples of active surface segments 135. The door 205 may be arranged between the conveyor belts 235-1, 235-2 and configured to selectively allow parcels through the opening 140. View 240 illustrates a side view of the diagram 230, in which the door 204 has a surface that is substantially coplanar with the surfaces of the conveyor belts 235-1, 235-2. Other relative positioning of the door 204 and the conveyor belts 235-1, 235-2 are also possible.

Figure 3A:
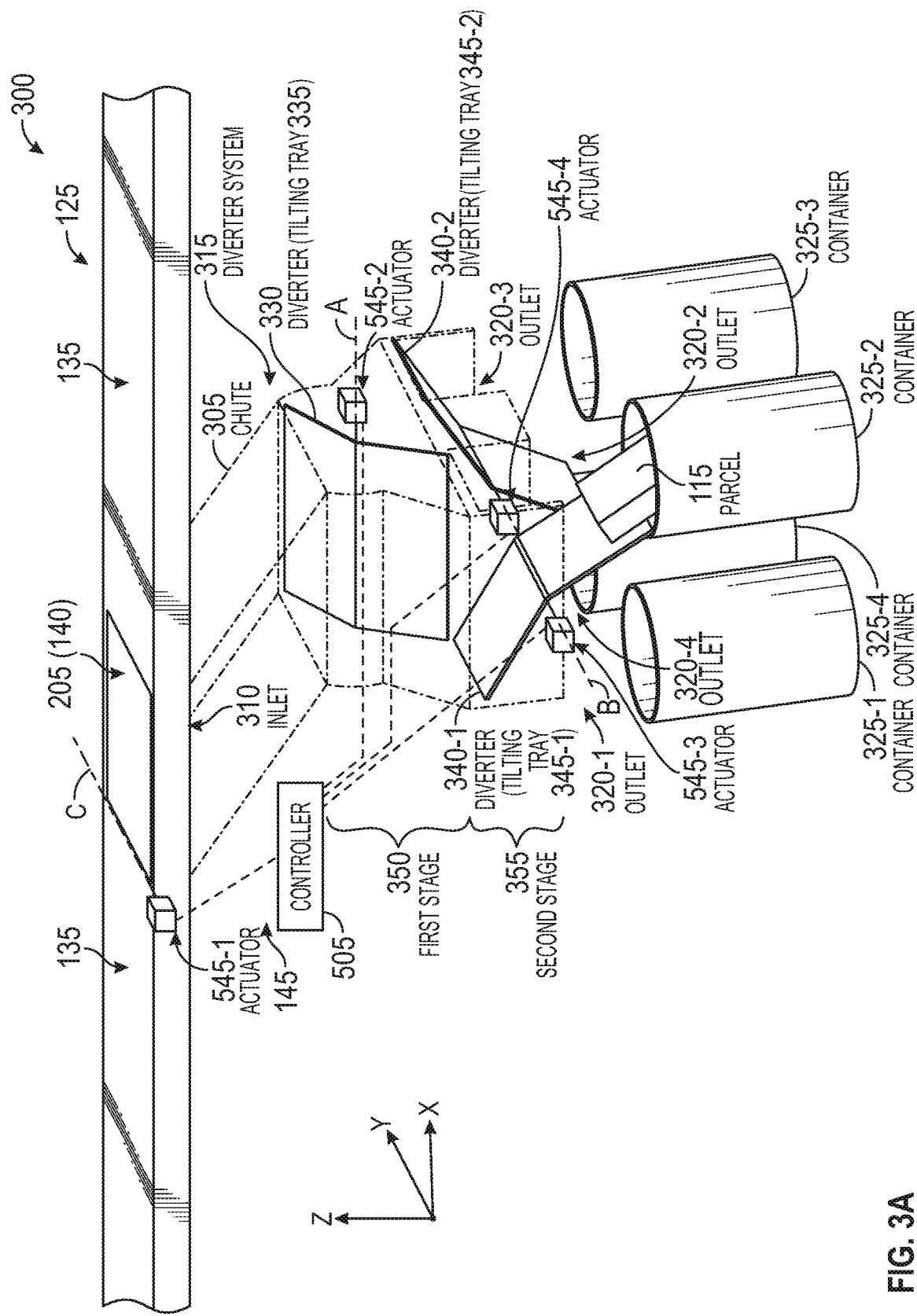
FIGS. 3A-3E illustrate embodiments of an exemplary routing manifold, according to various embodiments.

FIG. 3A is a diagram 300 illustrating an exemplary routing manifold 145, according to various embodiments. The routing manifold 145 may be used in conjunction with other embodiments, such as the transport surface 125 of FIGS. 1, 2.

The routing manifold 145 is disposed below the opening 140 and comprises a chute 305 having an inlet 310 registered with the opening 140. The routing manifold 145 further comprises a plurality of outlets 320-1, 320-2, 320-3, 320-4 that are coupled with the inlet 310. A diverter system 315 is disposed in the routing manifold 145 and comprising one or more diverters 330, 340-1, 340-2 that are actuatable to direct individual parcels toward a selected outlet of the plurality of outlets 320-1, 320-2, 320-3, 320-4. Each of the plurality of outlets 320-1, 320-2, 320-3, 320-4 is registered with a respective container 325-1, 325-2, 325-3, 325-4. In some embodiments, the routing manifold 145 is arranged such that the movement of parcels from the inlet 310 to the selected outlet is gravity-assisted.

The chute 305 may have any dimensioning that is suitable for registering the inlet 310 with the opening 140. In some embodiments, the door 205 is configured to at least partially extend through the inlet 310 into the chute 305 when the door 205 is positioned to open the opening 140 and allow one or more parcels through the opening 140. The chute 305 may also have any dimensioning and/or orientation for controlling speeds of parcels moving therethrough. In one example, the chute 305 has a substantially "vertical" orientation (i.e., extending primarily in the Z-direction). In another example, and as shown in the diagram 300, the chute 305 has a sloped orientation extending in the X-direction and Z-direction.

In some embodiments, the inlet 310 may be movable relative to the opening 140 and/or the plurality of outlets 320-1, 320-2, 320-3, 320-4 may be movable relative to the inlet 310. To that end, the chute 305 may be provisioned with any suitable rigid or flexible material(s). For example, the chute 305 may include wall sections formed of flexible material(s) and/or having a geometry such as pleated sides (e.g., having an appearance like a bellows or an accordion). More generally, the chute 305 can be provisioned with any flexible or articulating member(s) adapted to allow the routing manifold 315 to be moved between a number of positions.

Figure 3B:
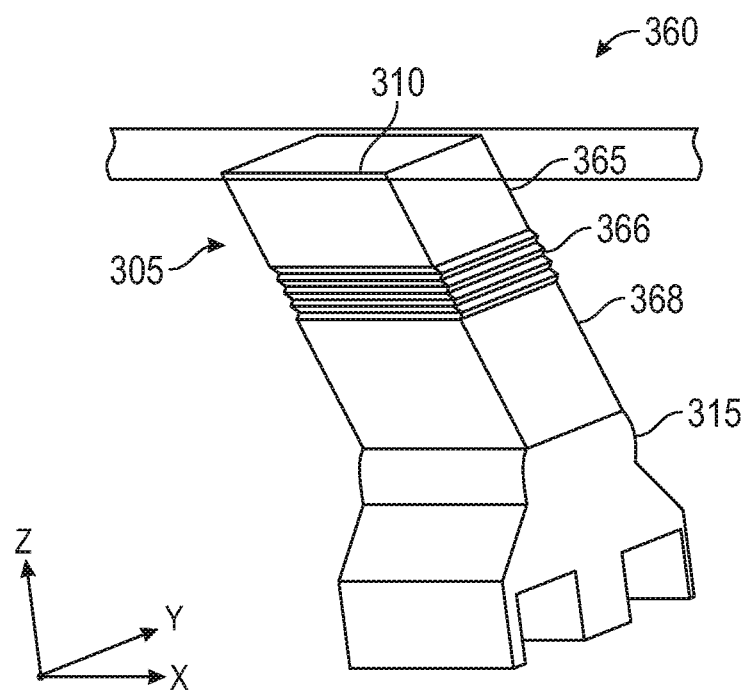
Figure 3C:
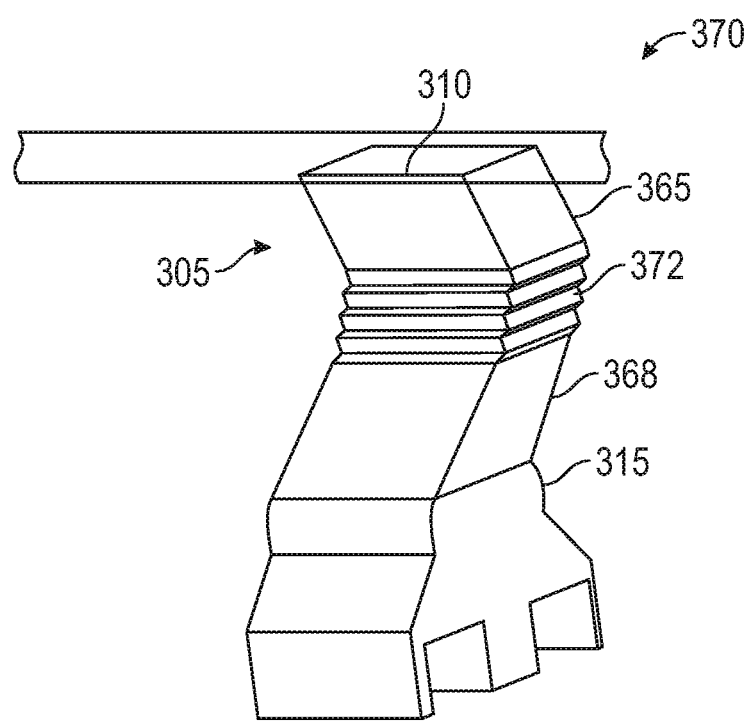

In one example, FIGS. 3B and 3C show the chute 305 provisioned with a bellows in a midsection of the chute 305. Diagram 360 of FIG. 3B generally depicts an orientation of the chute 305 that places the routing manifold 315 at a first position. A first, rigid section 365 extends from the inlet 310 to a first end of contracted bellows 366, and a second, flexible section 368 extends from a second end of the bellows 366 to the routing manifold 315. Diagram 370 of FIG. 3B generally depicts an orientation of the chute 305 that places the routing manifold 315 at a second position. The first, rigid section 365 remains in a static position and extends to the first end of expanded bellows 372, and the second, flexible section 368 extends to the routing manifold 315 with a different orientation. The expanded bellows 372 and the different orientation of the flexible section 368 allow the routing manifold 315 to be repositioned in any of the X, Y, and Z directions.

Further, the routing manifold 145 may include mechanical actuators for repositioning the chute 305 and/or the routing manifold 145 (e.g., through rolling or sliding), and/or means for manually repositioning the chute 305 and/or the routing manifold 145 (e.g., one or more handles operable by an associate). Thus, the routing manifold 145 may be reconfigurable to easily accommodate different types and/or arrangements of containers.

As shown, the diverter system 315 comprises a plurality of diverters 330, 340-1, 340-2. Each of the diverters 330, 340-1, 340-2 may have any suitable configuration for passively and/or actively diverting parcels onto a selected path of a plurality of paths. In some embodiments, each of the diverters 330, 340-1, 340-2 comprises a respective tilting tray 335, 345-1, 345-2. The tilting tray 335 is rotatable about an axis A, and the tilting trays 345-1, 345-2 are rotatable about an axis B. The tilting trays 335, 345-1, 345-2 may be individually actuatable using respective actuators 545-2, 545-3, 545-4, such as electric motors. The controller 505 is configured to communicate control signals with the actuators 545-2, 545-3, 545-4. In some embodiments, the controller 505 is further configured to communicate control signals with an actuator 545-1 that is connected with the door 205 and configured to rotate the door about an axis C.

Although the axes A, B are shown as being substantially perpendicular to each other, alternate implementations may have different relative orientations between the axes A, B. Further, in alternate implementations, the tilting trays 345-1, 345-2 may be rotatable about different axes having a desired relative orientation.

In some embodiments, the plurality of diverters 330, 340-1, 340-2 are arranged in a plurality of stages, in which each stage performs a respective sort operation for parcels moving therethrough. For example, the tilting tray 335 is arranged in a first stage 350 and actuatable to selectively direct individual parcels between at least a first path and a second path. The tilting tray 345-1 is arranged in a second stage 355 and coupled with the first path, and is actuatable to selectively direct individual parcels between at least a third path and a fourth path. The tilting tray 345-2 is arranged in the second stage 355 and coupled with the second path, and is actuatable to selectively direct individual parcels between at least a fifth path and a sixth path.

Each of the third path, fourth path, fifth path, and sixth path is coupled with a respective one or more outlets of the plurality of outlets 320-1, 320-2, 320-3, 320-4. As shown, the third path, fourth path, fifth path, and sixth path are coupled with the plurality of outlets 320-1, 320-2, 320-3, 320-4 in a 1:1 ratio. Other implementations may include different numbers of stages of diverters, such that paths selectable in the second stage 355 may correspond to the outlets of the diverter system 145 in different ratios.

As shown, each of the plurality of diverters 330, 340-1, 340-2 is actuatable between two discrete positions, and the plurality of outlets 320-1, 320-2, 320-3, 320-4 correspond to the plurality of containers 325-1, 325-2, 325-3, 325-4 in a 1:1 ratio. In some alternate implementations, one or more of the plurality of diverters 330, 340-1, 340-2 is actuatable between three or more positions, such that the outlets of the routing manifold 145 may correspond to the containers in ratios other than 1:1.

In the diagram 300, the diverters 330, 340-1, 340-2 are shown as respective tilting trays 335, 345-1, 345-2 that are each configured to direct parcels between two paths, and are dimensioned to have a substantially symmetrical profile from a side view. Stated another way, each of the tilting trays 335, 345-1, 345-2 is illustrated as extending to substantially equal lengths in two directions from the respective axis A, B of rotation. However, alternate implementations of the diverters 330, 340-1, 340-2 may be configured to direct parcels between three or more paths, and may have different dimensioning.

Figure 3D:
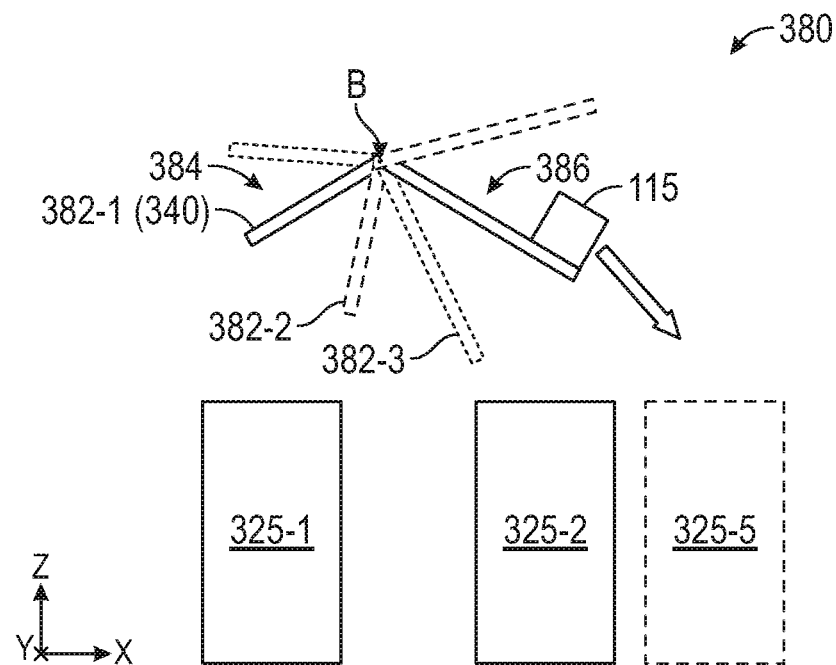

In one example, diagram 380 of FIG. 3D shows an example embodiment of a diverter 340 rotatable about the axis B to any of a plurality of positions 382-1, 382-2, 382-3. When the diverter 340 is in a first position 382-1 (represented by a solid outline), a parcel 115 will be directed into a container 325-5. When the diverter 340 is in a second position 382-2 (represented by a dashed outline), the parcel 115 will be directed into a container 325-1. When the diverter 340 is in a third position 382-3 (represented by a dotted outline), the parcel 115 will be directed into a container 325-2. In some embodiments, the diverter 340 comprises sections 384, 386 extending radially from the axis B in different directions and having different lengths. In some embodiments, the diverter system 315 and/or the routing manifold 145 may be dimensioned to control the speed of the parcel 115 differently based on which container the parcel 115 is destined for. For example, the diverter 340 may be maintained in a same position when directing the parcel 115 into different containers, and the parcel 115 is provided with a slower speed when directed into a proximal container, and with a faster speed when directed into a distal container.

Figure 3E:
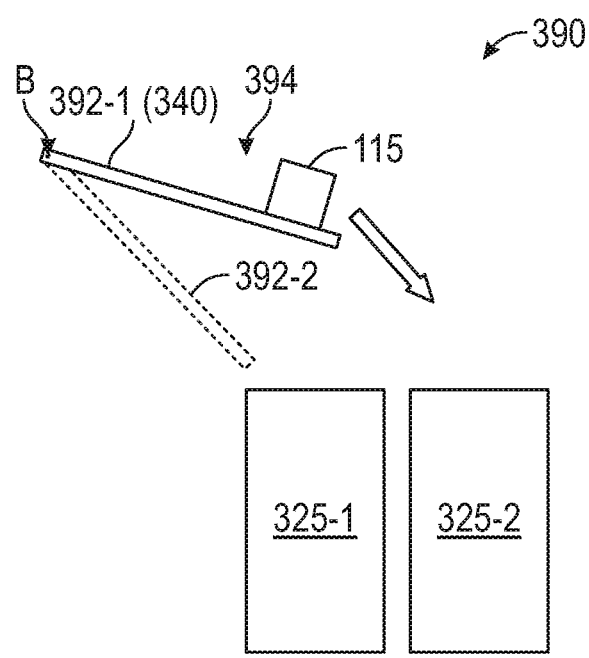

In another example, diagram 390 of FIG. 3E shows an example embodiment of a diverter 340 rotatable about the axis B to any of a plurality of positions 392-1, 392-2. In some embodiments, the diverter 340 comprises a single sections 394 extending radially from the axis B. When the diverter 340 is in a first position 392-1 (represented by a solid outline), the parcel 115 will be directed into a container 325-2. When the diverter 340 is in a second position 392-2 (represented by a dotted outline), the parcel 115 will be directed into a container 325-1.

Figure 4:
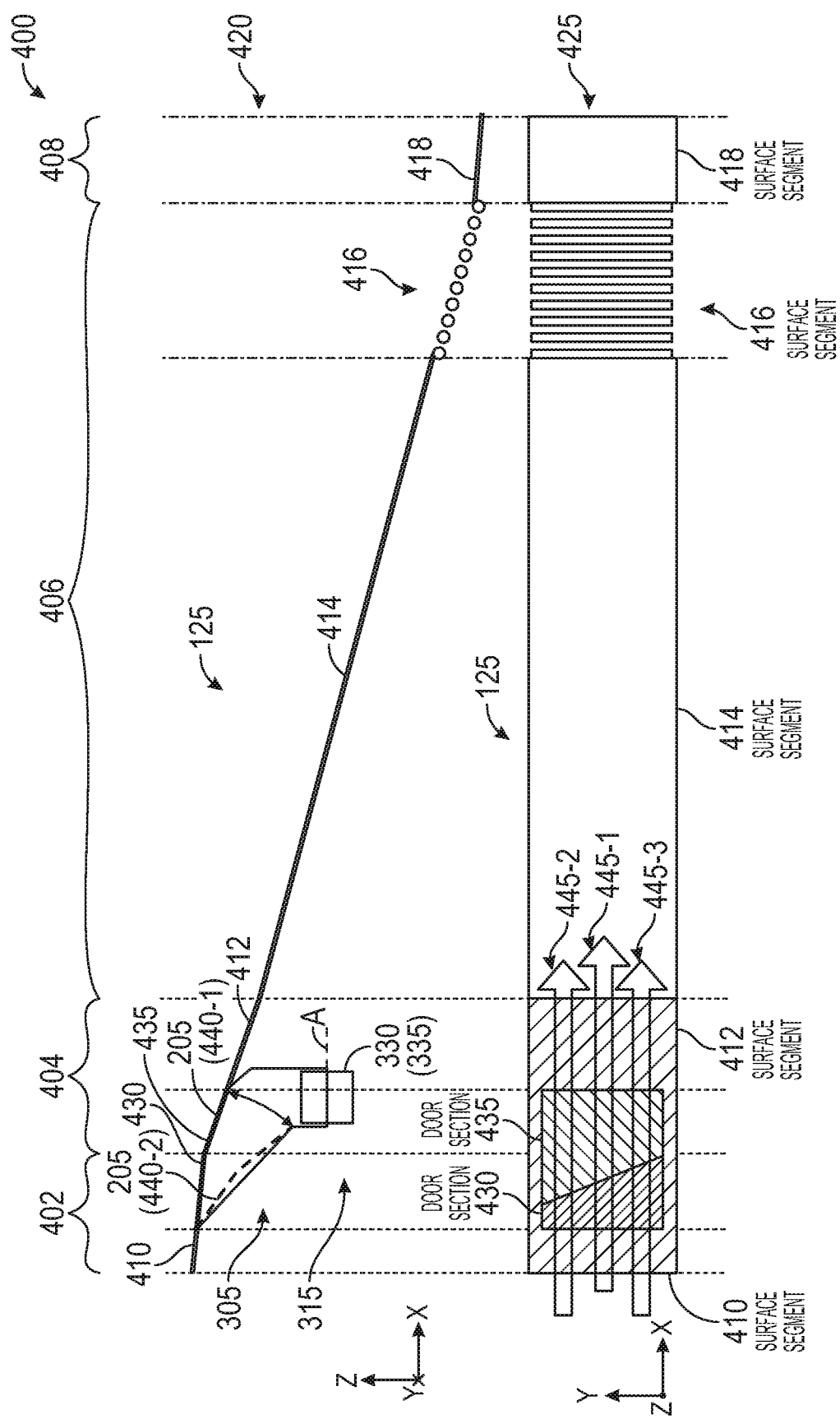
FIG. 4 is a diagram illustrating an exemplary transport surface, according to various embodiments.

FIG. 4 is a diagram 400 illustrating an exemplary transport surface 125, according to various embodiments. More specifically, the diagram 400 illustrates a side view 420 and a top view 425 of the transport surface 125. The features of the transport surface 125 may be used in conjunction with other embodiments, such as the system 100 of FIG. 1 and/or the routing manifold 145 of FIG. 3.

The transport surface 125 comprises a plurality of slope regions 402, 404, 406, 408. Each of the slope regions 402, 404, 406, 408 may have a respective slope selected to control speeds of the parcels as they are conveyed along the transport surface 125. Beneficially, controlling speeds of the parcels may allow a more efficient sorting and/or processing of the parcels, as well as mitigating a risk of damage to the parcels during conveyance. In some embodiments, the slope region 402 has a slope between about 5° and about 15° relative to a reference surface, such as a floor level of a warehouse. In some embodiments, the slope region 404 has a slope between about 10° and 35°, which in some cases may be greater than that of the slope region 402. In some embodiments, the slope region 406 has a slope between about 10° and about 25°, which in some cases may be less than the slope of the slope region 404 and/or greater than the slope of the slope region 402. In some embodiments, the slope region 408 has a slope between about −5° and 10°, which in some cases may be less than the slope of the slope region 406. In one non-limiting example, the slope region 402 has a slope of about 7°, the slope region 404 has a slope of about 20°, the slope region 406 has a slope of about 15°, and the slope region 408 has a slope of about 5°.

The transport surface 125 comprises a plurality of surface segments 410, 412, 414, 416, 418. As discussed above, the plurality of surface segments 410, 412, 414, 416, 418 may have a selected geometry and surface characteristics for controlling speeds of the parcels as they are conveyed between an upstream point and a downstream point of the transport surface. In one non-limiting example, the surface segment 410 has a length of about 500 millimeters (mm), a first door segment 430 has a length of about 900 mm, a second door segment 435 has a length of about 800 mm, the surface segment 412 has a length of about 1200 mm, the surface segment 414 has a length of about 8000 mm, the surface segment 416 has a length of about 2000 mm, and the surface segment 418 has a length of about 1000 mm. In some embodiments, the surface segments 410, 412 are spaced apart such that the opening has a length of about 1700 mm, although other lengths of the opening are also possible.

The surface segment 410 and the first door segment 430 are included in the slope region 402, the surface segment 412 and the second door segment 435 are included in the slope region 404, the surface segments 414, 416 are included in the slope region 406, and the surface segment 418 is included in the slope region 408. The surface segments 410, 412, 414, 416, 418 may have any suitable implementation. For example, the surface segments 410, 412, 414, 418 may comprise sliding surfaces, and the surface segment 416 comprises a plurality of motor-driven rollers, gravity skate rollers, or swivel wheel bars.

In some embodiments, a first door section 430 of the door 205 is included in the first surface segment 410, and a second door section 435 of the door 205 is included in the second surface segment 412. In this way, the door 205 forms a portion of the transport surface 125, the first door section 430 defines a first subportion of the portion, and the second door section 435 defines a second subportion of the portion. In some embodiments, the first subportion has a first coefficient of friction and the second subportion has a different, second coefficient of friction.

In some embodiments, when the door 205 is positioned in a closed position 440-1, individual parcels are conveyed along a first path 445-1 across the first subportion and the second subportion of the portion of the transport surface 125 defined by the door 205, and a diverter system (e.g., the diverter system 215 of FIG. 2) may be configured to arrange the individual parcels to control a proportion of the first subportion and the second subportion that is included in the path 445. For example, assume that the second coefficient of friction associated with the second door section 435 is greater than the first coefficient of friction associated with the first door section 430. To slow certain parcels (e.g., heavier parcels), the diverter system may adjust the positioning of the parcel in the positive-Y direction, such that the parcel will travel along a second path 445-2 that includes a greater proportion of the (greater) second coefficient of friction. In a similar manner, the diverter system may adjust the positioning of the parcel in the negative-Y direction to increase the speed of certain parcels, such that the parcels will travel along a third path 445-3 that includes a lesser proportion of the (greater) second coefficient of friction. Stated another way, the diverter system may control a composite coefficient of friction that is associated with the movement of the parcels across the door 205.

As shown, each of the surface segments 410, 412 has a right trapezoid shape, and each of the first door section 430 and the second door section 435 has a right trapezoid shape. At least one side of the door section 430 is overlapping with at least one side of the surface segment 410, and at least one side of the door section 435 is overlapping with at least one side of the surface segment 412. However, alternate implementations may include different shapes of the surface segments 410, 412 and/or the door sections 430, 435.

When the door 205 is positioned in an open position 440-2, individual parcels may pass through the opening into the chute 305 and the diverter system 315. A first diverter 330 (e.g., a tilting tray 335) of the diverter system 315 is shown. Alternate numbers of diverters are also possible, such as the plurality of diverters depicted in FIG. 3.

Figure 5:
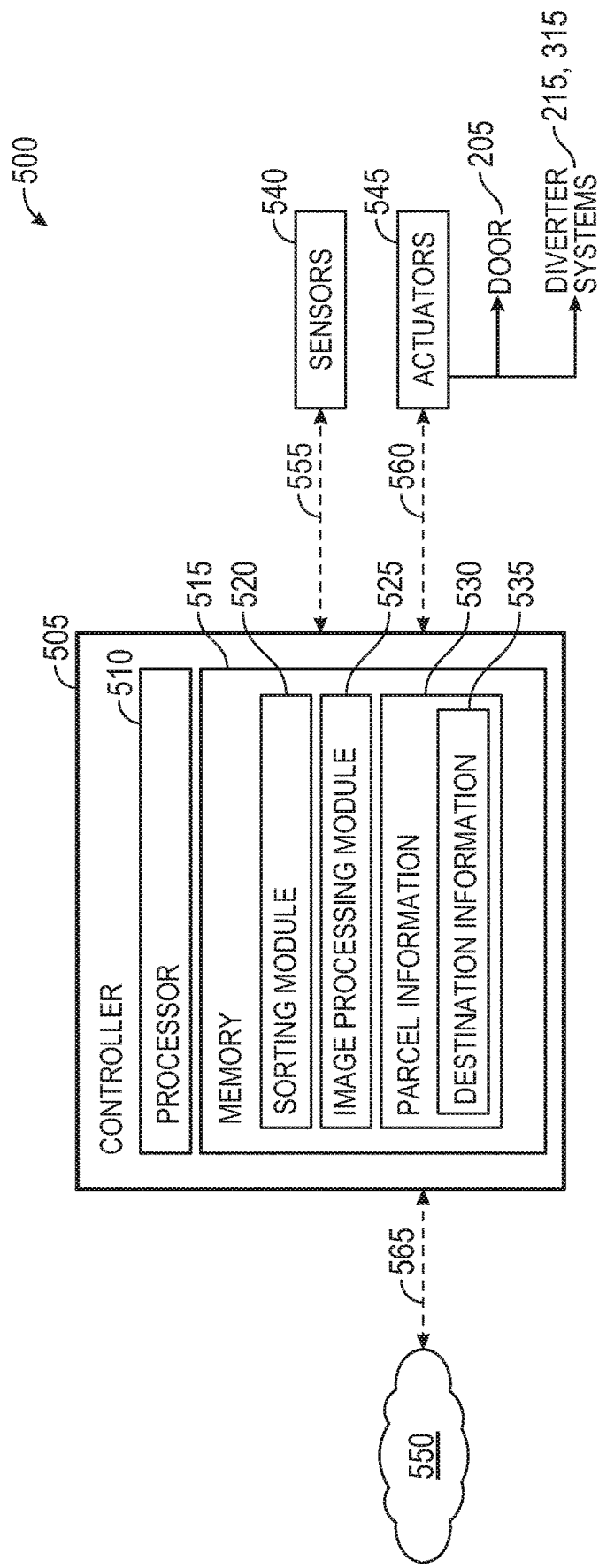
FIG. 5 is a block diagram illustrating an exemplary controller, according to various embodiments.

FIG. 5 is a block diagram illustrating a system 500 comprising an exemplary controller 505, according to various embodiments. The controller 505 may be used in conjunction with other embodiments, such as the system 100 of FIG. 1 and/or the routing manifold 145 of FIG. 3.

The controller 505 comprises one or more computer processors 510 and a memory 515. The one or more computer processors 510 represent any number of processing elements that each can include any number of processing cores. Some non-limiting examples of the one or more computer processors 510 include a microprocessor, a digital signal processor (DSP), an application-specific integrated chip (ASIC), and a field programmable gate array (FPGA), or combinations thereof. The memory 515 may comprise volatile memory elements (such as random access memory), non-volatile memory elements (such as solid-state, magnetic, optical, or Flash-based storage), and combinations thereof. Moreover, the memory 515 may be distributed across different mediums (e.g., network storage or external hard drives).

The controller 505 may be communicatively coupled with one or more sensors 540 using one or more communication links 555, and with one or more actuators 545 using one or more communication links 560. The one or more sensors 540 are configured to identify and/or track parcels during conveyance along a transport surface. Some non-limiting types of the one or more sensors 540 include visual sensors configured to acquire imagery of the parcels, and radio-frequency identification (RFID) readers configured to receive identification data from RFID tags included with the parcels.

The one or more actuators 545 are connected with one or more actuatable components associated with the transport surface 125 of FIG. 1. The one or more actuators 545 may be of any suitable type(s), such as hydraulic, pneumatic, electric, and/or mechanical actuators. Some non-limiting examples of the one or more actuatable components comprise one or more doors 205 (FIG. 2) disposed at opening(s) in the transport surface 125, a diverter system 215 (FIG. 2) configured to divert or otherwise position parcels to be conveyed toward and/or away from the opening, and a diverter system 315 configured to direct individual parcels toward a selected outlet of a plurality of outlets.

The controller 505 may further be communicatively coupled with a network 550 using one or more communication links 565. The network 550 may include one or more networks of various types, including a local area or local access network (LAN), a general wide area network (WAN), and/or a public network (e.g., the Internet). In one example, the controller 505 is communicatively coupled with one or more other controllers that are used to control other stages of parcel processing, such as an autosorting stage that provides the parcels to a sorting stage associated with the controller 505.

The memory 515 may comprise a plurality of "modules" for performing various functions described herein. In one embodiment, each module includes program code that is executable by one or more of the computer processors 510. However, other embodiments may include modules that are partially or fully implemented in hardware (i.e., circuitry) or firmware of the controller 505. As shown, the memory 515 comprises a sorting module 520 and an image processing module 525.

The sorting module 520 is configured to sort or distribute parcels according to a predefined algorithm. The sorting module 520 is further configured to communicate control signals to the one or more actuators 545 to sort the parcels while being conveyed along a transport surface. The image processing module 525 may use any suitable processing techniques for extracting information from imagery acquired from visual sensor(s) of the one or more sensors 540.

In some embodiments, the memory 515 may further comprise parcel information 530 associated with the different parcels being tracked, which may include destination information 535 associated with the parcels. The destination information 535 may have any suitable form, such as a destination within the warehouse (e.g., a particular container or a particular environment location), a destination external to the warehouse (e.g., a portion of a destination mailing address or a particular transport vehicle), and so forth. In one non-limiting example, the destination information 535 may include ZIP codes of a mailing addresses associated with the parcels.

In some embodiments, a visual sensor of the one or more sensors 540 is configured to acquire imagery of the parcels, which may include labelling on the parcels. The image processing module 525 may be used to extract parcel information 530, which may include physical properties of the parcels and/or other information included in labels attached to the parcels. In some embodiments, the destination information 535 may be included in the labelling. In other embodiments, the destination information 535 may use some or all of the extracted parcel information 530 to identify the parcels, and the sorting module 520 may acquire the destination information 535 for the identified parcels using the network 550. For example, assume that the parcel information 530 identifies a long, rectangular parcel and a small square parcel. The sorting module 520 may request the destination information 535 from a controller that is associated with a previous processing stage, and operate the one or more actuators 545 according to the destination information 535.

Although the previous examples describe the operation of the sorting module 520 in terms of destination information 535 for the various parcels, other implementations of the sorting module 520 may employ different algorithms. In one non-limiting example, the sorting module 520 may be configured to perform load balancing, and may distribute parcels substantially evenly among a number of containers.

Figure 6:
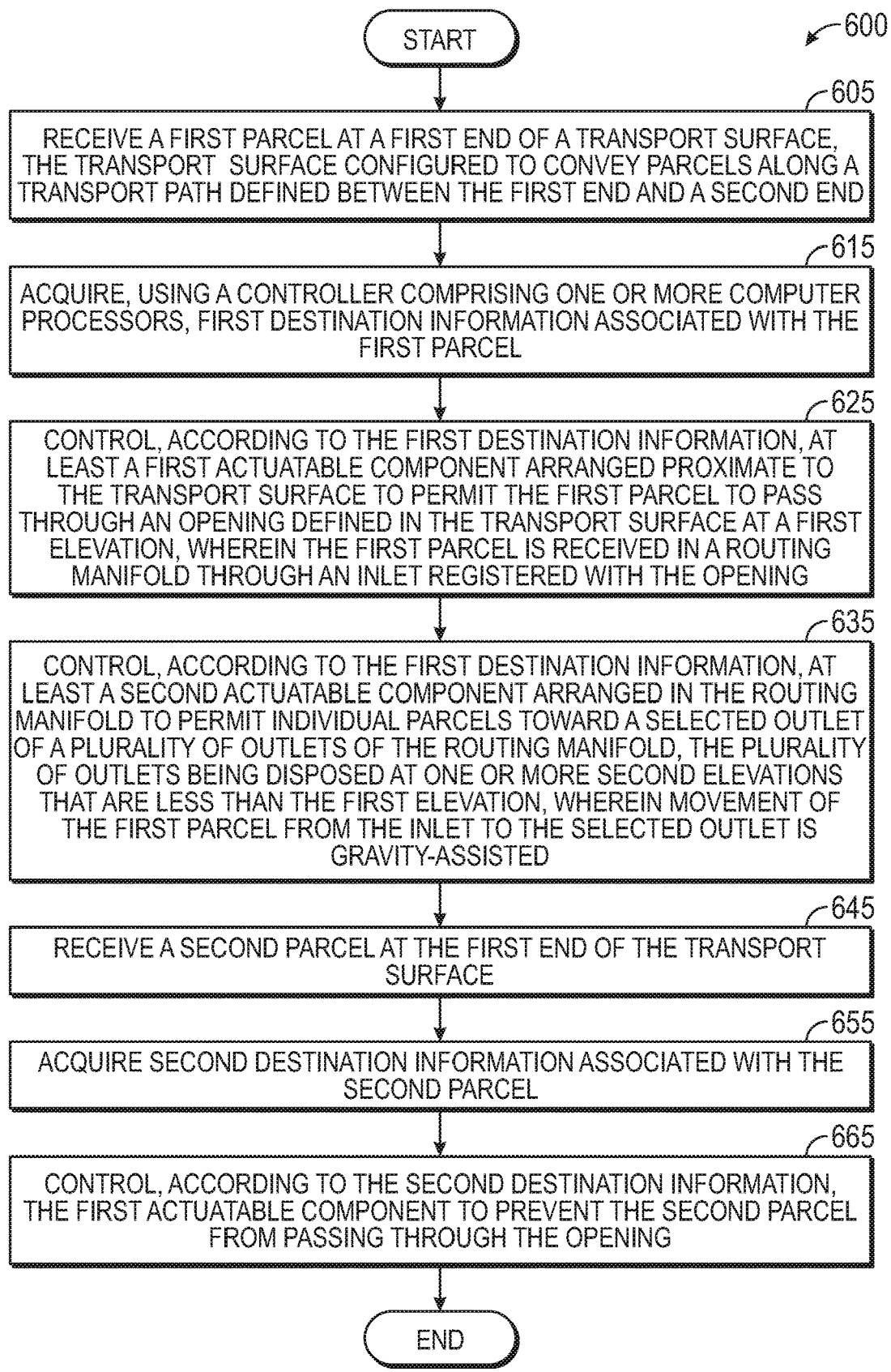
FIG. 6 illustrates an exemplary method of sorting parcels, according to various embodiments.

FIG. 6 illustrates an exemplary method 600 of sorting parcels, according to various embodiments. The method 600 may be used in conjunction with other embodiments, such as the system 100 of FIG. 1 and/or the controller 505 of FIG. 5.

The method 600 begins at block 605, where a first parcel is received at a first end of a transport surface. The transport surface is configured to convey parcels along a transport path defined between the first end and a second end. At block 615, the controller acquires first destination information associated with the first parcel.

At block 625, the controller controls, according to the first destination information, at least a first actuatable component arranged proximate to the transport surface to permit the first parcel to pass through an opening defined in the transport surface at a first elevation. The first parcel is received in a routing manifold through an inlet that is registered with the opening.

At block 635, the controller controls, according to the first destination information, at least a second actuatable component arranged in the routing manifold to permit individual parcels toward a selected outlet of a plurality of outlets of the routing manifold. In some embodiments, the plurality of outlets are disposed at one or more second elevations that are less than the first elevation. In some embodiments, movement of the first parcel from the inlet to the selected outlet is gravity-assisted.

At block 645, a second parcel is received at the first end of the transport surface. At block 655, the controller acquires second destination information associated with the second parcel. At block 665, the controller controls, according to the second destination information, the first actuatable component to prevent the second parcel from passing through the opening. Method 600 ends following completion of block 665.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be used to implement embodiments of the disclosure. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An apparatus for sorting parcels, the apparatus comprising:
   a slide defining a transport surface configured to convey parcels from an upstream point of the slide to a downstream point of the slide, the slide further defining an opening in the transport surface that is dimensioned to receive one or more of the parcels therethrough;
   at least one door disposed in the slide, the door being selectively positionable between at least:
      a first position in which the door closes the opening and forms at least a portion of the transport surface, and
      a second position in which the door opens the opening to allow the one or more parcels therethrough, wherein the door comprises:
         a first door section defining a first subportion of the portion of the transport surface, the first subportion having a first coefficient of friction; and
         a second door section defining a second subportion of the portion of the transport surface, the second subportion having a different, second coefficient of friction; and
   a routing manifold disposed below the opening and comprising:
      a diverter system comprising one or more diverters actuatable to direct individual parcels toward a selected outlet of a plurality of outlets.

2. The apparatus of claim 1, wherein the one or more diverters comprises one or more tilting trays.

3. The apparatus of claim 1, wherein the one or more diverters comprises a plurality of diverters arranged in a cascading arrangement.

4. The apparatus of claim 3, wherein the plurality of diverters comprises:
   a first tilting tray arranged in a first stage, the first tilting tray actuatable to selectively direct individual parcels between at least a first path and a second path;
   a second tilting tray arranged in a second stage and coupled with the first path, the second tilting tray actuatable to selectively direct individual parcels between at least a third path and a fourth path; and
   a third tilting tray arranged in the second stage and coupled with the second path, the third tilting tray actuatable to selectively direct individual parcels between at least a fifth path and a sixth path,
   wherein each of the third path, fourth path, fifth path, and sixth path is coupled with a respective one or more outlets of the plurality of outlets.

5. The apparatus of claim 1, further comprising:
a controller communicatively coupled with a first actuator connected with the door and one or more second actuators connected with the one or more diverters,
wherein the controller is configured to actuate the first actuator and the one or more second actuators according to destination information associated with the one or more parcels.

6. The apparatus of claim 1, wherein, when the door is in the first position, the individual parcels are conveyed along a path across the first subportion and the second subportion, the apparatus further comprising:
a second diverter system configured to arrange the individual parcels to control a proportion of the first subportion and the second subportion included in the path.

7. The apparatus of claim 1, wherein the first subportion has a first slope and the second subportion has a different, second slope.

8. The apparatus of claim 1, wherein the slide comprises:
a plurality of surface segments that are arranged between the upstream point and the downstream point and that collectively define the transport surface, and
wherein each of the plurality of surface segments has selected geometry and surface characteristics for controlling speeds of the parcels as the parcels are conveyed on the slide between the upstream point and the downstream point.

9. The apparatus of claim 1, wherein the routing manifold further comprises:
a chute having an inlet registered with the opening; and the plurality of outlets coupled with the inlet.

10. The apparatus of claim 9, wherein at least one of:
the inlet of the chute is movable relative to the opening; and
the plurality of outlets are movable relative to the inlet.

11. An apparatus for sorting parcels, the apparatus comprising:
a transport surface configured to convey parcels along a transport path defined between a first end and a second end of the transport surface, wherein an opening is defined in the transport surface at a first elevation and is dimensioned to receive one or more of the parcels therethrough; and
a routing manifold disposed at a second elevation less than the first elevation and comprising:
a chute having an inlet registered with the opening;
a plurality of outlets coupled to the inlet; and
a first diverter system comprising a plurality of diverters disposed in the routing manifold and operable to selectively direct the received parcels toward any outlet of the plurality of outlets, wherein the plurality of diverters are responsive to destination information associated with the individual parcels, wherein the plurality of diverters comprises:
a first tilting tray arranged in a first stage, the first tilting tray actuatable to selectively direct individual parcels between at least a first path and a second path;
a second tilting tray arranged in a second stage and coupled with the first path, the second tilting tray actuatable to selectively direct individual parcels between at least a third path and a fourth path; and
a third tilting tray arranged in the second stage and coupled with the second path, the third tilting tray actuatable to selectively direct individual parcels between at least a fifth path and a sixth path.

12. The apparatus of claim 11, wherein each of the third path, fourth path, fifth path, and sixth path is coupled with a respective one or more outlets of the plurality of outlets.

13. The apparatus of claim 11, wherein at least a first surface segment of a plurality of surface segments of the transport surface has a first slope, and
wherein at least a second surface segment of the plurality of surface segments has a different second slope.

14. The apparatus of claim 11, further comprising:
a door arranged at the opening; and
an actuator connected with the door and responsive to the destination information to selectively position the door between at least:
a first position in which the door closes the opening and forms at least a portion of the transport surface, and
a second position in which the door opens the opening to allow the one or more parcels therethrough.

15. The apparatus of claim 14, wherein the door comprises:
a first door section defining a first subportion of the portion of the transport surface, the first subportion having a first coefficient of friction; and
a second door section defining a second subportion of the portion of the transport surface, the second subportion having a different, second coefficient of friction.

16. The apparatus of claim 11, wherein the transport surface comprises a plurality of surface segments arranged between the first end and the second end, each of the plurality of surface segments having selected geometry and surface characteristics for controlling speeds of the parcels as they are conveyed along the transport path.

17. The apparatus of claim 16, wherein the plurality of surface segments form a substantially continuous sliding surface between the first end and the second end.

18. A method comprising:
receiving a first parcel at a first end of a transport surface, the transport surface configured to convey parcels along a transport path defined between the first end and a second end;
acquiring, using a controller comprising one or more computer processors, first destination information associated with the first parcel;
controlling, according to the first destination information, at least a first actuatable component arranged proximate to the transport surface to permit the first parcel to pass through an opening defined in the transport surface at a first elevation, wherein the first parcel is received in a routing manifold through an inlet registered with the opening; and
controlling, according to the first destination information, at least a second actuatable component arranged in the routing manifold to permit individual parcels toward a selected outlet of a plurality of outlets of the routing manifold,
wherein the second actuatable component comprises a tilting tray connected with a first actuator,
wherein the plurality of outlets are disposed at one or more second elevations that are less than the first elevation, and
wherein movement of the first parcel from the inlet to the selected outlet is gravity-assisted.

19. The method of claim 18, wherein the first actuatable component comprises a door arranged at the opening and connected with a second actuator, and wherein controlling the first actuatable component comprises:
from a first position in which the door forms at least a portion of the transport surface, actuating the door to a second position in which the door opens the opening to permit the first parcel to pass therethrough.

20. The method of claim 18, further comprising:
receiving a second parcel at the first end of the transport surface;
acquiring second destination information associated with the second parcel; and
controlling, according to the second destination information, the first actuatable component to prevent the second parcel from passing through the opening.

* * * * *